United States Patent
Lin et al.

(10) Patent No.: US 9,984,289 B2
(45) Date of Patent: May 29, 2018

(54) GAZE ANALYSIS METHOD AND APPARATUS

(71) Applicant: INSTITUTE FOR INFORMATION INDUSTRY, Taipei (TW)

(72) Inventors: Ching-Wen Lin, New Taipei (TW); Kuei-Chien Tsai, Keelung (TW)

(73) Assignee: Institute For Information Industry, Taipei (TW)

( * ) Notice: Subject to any disclaimer, the term of this patent is extended or adjusted under 35 U.S.C. 154(b) by 183 days.

(21) Appl. No.: 14/884,200

(22) Filed: Oct. 15, 2015

(65) Prior Publication Data

US 2017/0032173 A1  Feb. 2, 2017

(30) Foreign Application Priority Data

Jul. 29, 2015  (TW) .............................. 104124525 A

(51) Int. Cl.
*G06K 9/00* (2006.01)
*G06F 3/01* (2006.01)

(52) U.S. Cl.
CPC ......... *G06K 9/00597* (2013.01); *G06F 3/013* (2013.01)

(58) Field of Classification Search
CPC ..... G06F 11/34; G06F 3/013; G06K 9/00597; G06Q 30/02; H04L 29/08; H04L 67/22
USPC .......................................................... 348/78
See application file for complete search history.

(56) References Cited

U.S. PATENT DOCUMENTS

| | | | | |
|---|---|---|---|---|
| 9,638,537 | B2 * | 5/2017 | Abramson | G01C 21/3626 |
| 2003/0118217 | A1 * | 6/2003 | Kondo | G06K 9/00604 382/117 |
| 2003/0169907 | A1 * | 9/2003 | Edwards | G06K 9/00248 382/118 |
| 2008/0297589 | A1 * | 12/2008 | Kurtz | H04N 7/147 348/14.16 |
| 2010/0182409 | A1 * | 7/2010 | Suzuki | H04N 13/026 348/51 |
| 2012/0200689 | A1 * | 8/2012 | Friedman | G06K 9/00255 348/78 |
| 2012/0219180 | A1 * | 8/2012 | Mehra | G06F 3/013 382/103 |
| 2013/0162799 | A1 * | 6/2013 | Hanna | A61B 5/117 348/78 |

(Continued)

OTHER PUBLICATIONS

Yi et al, Real time learning evaluation based on gaze tracking, 2015.*

(Continued)

*Primary Examiner* — Shan E Elahi

(57) ABSTRACT

A gaze analysis method has following steps. When detecting at least one face in an image, according to a face angle and an eye angle, a gazing angle is calculated, and whether the gazing angle falls within a first range is determined, wherein the eye angle is obtained according to information of irises and scleras of left and right eyes. A differential value between a focusing distance and a spacing distance from the face to the object falls within a second range is determined if the gazing angle falls within the first range, and a detecting result whether the differential value falls within the second range is used to determine whether the object is gazed, wherein the focusing distance is determined according to the information of the irises and scleras of the left and right eyes.

18 Claims, 7 Drawing Sheets

(56) References Cited

U.S. PATENT DOCUMENTS

| | | | | |
|---|---|---|---|---|
| 2014/0201126 A1* | 7/2014 | Zadeh | .................. | G06N 7/005 |
| | | | | 706/52 |
| 2014/0310256 A1* | 10/2014 | Olsson | .................. | G06F 3/013 |
| | | | | 707/706 |
| 2014/0364212 A1* | 12/2014 | Osman | ................ | A63F 13/213 |
| | | | | 463/31 |
| 2015/0269712 A1* | 9/2015 | Florea | ............... | G06K 9/00221 |
| | | | | 382/199 |
| 2015/0326570 A1* | 11/2015 | Publicover | ............. | G06F 21/64 |
| | | | | 726/4 |

OTHER PUBLICATIONS

Vranceanu et al, Automatic detection of gaze direction for NLP applications, 2013.*

Funahashi et al, Face and Eye Tracking for Gaze Analysis, Oct. 17-20, 2007.*

Funahashi et al, Face and Eye Tracking for Gaze Analysis (Year: 2007).*

* cited by examiner

GAZE ANALYSIS METHOD AND APPARATUS

BACKGROUND

1. Technical Field

The disclosed embodiments relate generally to an image analysis technology, and more particularly, to a gaze analysis method and apparatus.

2. Description of Related Art

With the development of the electronic technology, the image capturing devices can be widely used in electronic apparatuses of different kinds, such as hand-held devices, notebooks, or electronic advertising board. The gaze analysis of the captured image can be performed with the software algorithm to determine whether the person in the captured image gazes at the specific object in the electronic apparatus, and a corresponding command, such as displaying a corresponding specific information, can then be executed accordingly.

One current gaze analysis technology uses the cornea reflection manner to obtain positions of the pupil center points and relative positions of infrared ray reflection points to determine the vision direction of the person, such that whether the specific object is gazed by the person is determined. However, the manner needs the help of the infrared ray, and the infrared ray is too close to the eyes of the person, thus inducing the safety issue. In addition, the manner must use the image capturing device with the high resolution, and the analysis accuracy thereof is affected by the light illumination easily.

Other one current gaze analysis technology is used to find the inside and outside eye corns, and after the ranges of the eye balls are identified, the center points of the irises are detected to map them to the corresponding positions of the iris edge model, so as to determine whether the specific object is gazed by the person. The manner must store the eye modules previously, and perform the complex model matching.

Other one current gaze analysis technology is used to record the images of the pupils, and after performing the complex correction and verification procedures, the manner can determine whether the specific object is gazed by the person.

Other one current gaze analysis technology uses electrodes as the sensors, and the electrodes are attached on the skin of the face to sense the action behaviors of the muscles near to the eyes. Thus, the horizontal and vertical actions of the eyes are measured, and whether the specific object is gazed by the person is determined.

Each mentioned gaze analysis technology has its disadvantages, such as requiring the help of the aiding device, being affected by the light illumination, and unavoidably performing the complex matching, correction, or verification.

SUMMARY

An exemplary embodiment of the present disclosure provides a gaze analysis method having following steps. When detecting at least one face in an image, according to a face angle and an eye angle, a gazing angle is calculated, and whether the gazing angle falls within a first range is determined, wherein the eye angle is obtained according to information of irises and scleras of left and right eyes. A differential value between a focusing distance and a spacing distance from the face to the object falls within a second range is determined if the gazing angle falls within the first range, and a detecting result whether the differential value falls within the second range is used to determine whether the object is gazed, wherein the focusing distance is determined according to the information of the irises and scleras of the left and right eyes.

An exemplary embodiment of the present disclosure provides a gaze analysis apparatus comprising at least one circuit for executing the gaze analysis method.

Accordingly, the gaze analysis method and apparatus provided by exemplary embodiments of the present disclosure determine whether the person gazes at the object according to the information of the irises and scleras of the left and right eyes. Thus, compared to the related art, the gaze analysis method and apparatus are not affected by the light illumination easily, have low computation complexity, and also have low costs since they do not need the high resolution lens and the help of infrared ray.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings provide a further understanding to the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
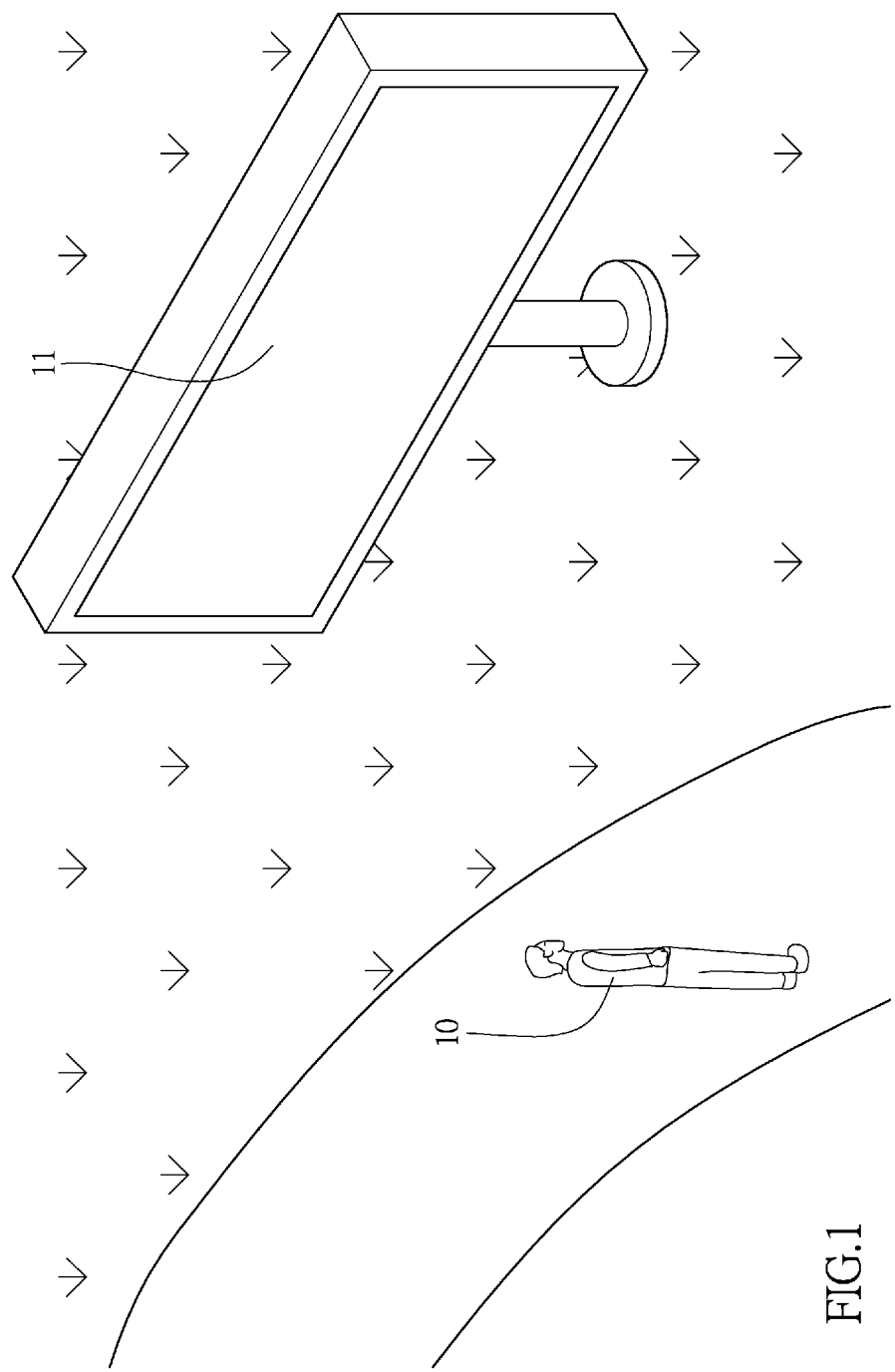
FIG. 1 is schematic diagram showing a person gazes at an object according to an exemplary embodiment of the present disclosure.

Reference will now be made in detail to exemplary embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits, and networks have not been described in detail so as not to unnecessarily obscure aspects of the exemplary embodiments.

Exemplary embodiment of the present disclosure provides a gaze analysis method and apparatus, and the gaze analysis method and apparatus calculate a face angle and an eye angle, so as to determine whether the gazing direction of the eyes is towards a specific direction, wherein the eye angle is obtained according to information of an iris and a sclera of a left eye and information of an iris and a sclera of a right eye, the information of the iris and the sclera of the left eye can be the length (i.e. the unit may be the pixel) of the iris of the left eye in the image and the lengths of the left and right portions of the sclera of the left eye in the image, and the information of the iris and the sclera of the right eye can be the length of the iris of the right eye in the image and the lengths of the left and right portions of the sclera of the right eye in the image. Next, the gaze analysis method and apparatus further determine whether the person gazes at the specific object on the specific direction, and calculate the time which the person gazes at the specific object, so as to determine whether the person continuously gazes at the specific object, and execute the corresponding command accordingly.

It is noted that, in the exemplary embodiment of the present disclosure, the eye angle is determined according to a ratio relation of lengths of the two irises and the two scleras associated with the left and right eyes. For example, the eye angle is determined according to a first ratio of a first differential length over a total length of the left eye and the right eye and a second ratio of a second differential length over the total length of the left eye and the right eye and a ratio, wherein the first differential length is a differential between left and right portions of the sclera within the left eye, and the first differential length is a differential between left and right portions of the sclera within the right eye.

Furthermore, whether the person gazes at the specific object on the specific direction can be determined according to whether the differential value between the focusing distance of the eyes and the a spacing distance falls within a second range, wherein the focusing distance of the eyes is obtained according to the information of the iris and the sclera of the left eye and the information of the iris and the sclera of the right eye. For example, in one exemplary embodiment of the present disclosure, a left eye angle which a center point of an eye ball of the left eye is towards a focusing point is determined according to a third ratio which a left portion of the sclera of the left eye occupies within all of the sclera of the left eye, a right eye angle which a center point of an eye ball of the right eye is towards the focusing point is determined according to a fourth ratio which a right portion of the sclera of the right eye occupies within all of the sclera of the right eye, and the focusing distance is determined according to the left eye angle, the right eye angle, and a distance between the two center points of the eye balls of the right and left eyes.

Referring to FIG. 1, FIG. 1 is schematic diagram showing a person gazes at an object according to an exemplary embodiment of the present disclosure. In FIG. 1, the electronic apparatus 11, is as the object in this exemplary embodiment, has a gaze analysis apparatus to determine whether the person 10 gazes at the electronic apparatus 11, so as the corresponding command, such as displaying the specific information to the person 10, is executed accordingly. The electronic apparatus 11 itself can be an advertising board, and however the present disclosure is not limited thereto. The electronic apparatus 11 in another one exemplary embodiment can be a notebook or other one device with the image capturing device, for example. In the other one exemplary embodiment, the electronic apparatus 11 itself may not be as the object, and the object may be other some specific object, such as the speaker or a specific sale product. Next, the details of the gaze analysis apparatus will be described.

Figure 2:
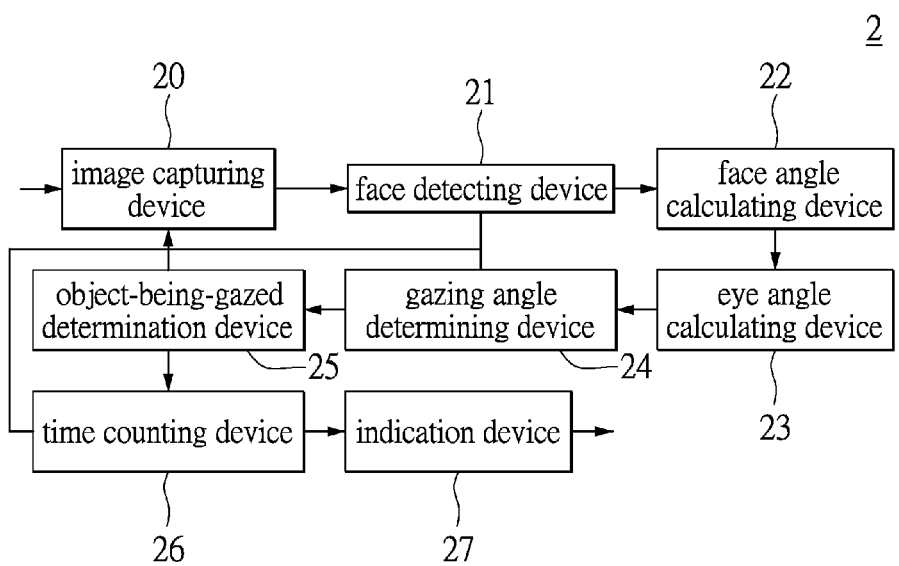
FIG. 2 is block diagram of a gaze analysis apparatus according to an exemplary embodiment of the present disclosure.

Referring to FIG. 2, FIG. 2 is block diagram of a gaze analysis apparatus according to an exemplary embodiment of the present disclosure. The gaze analysis apparatus 2 is composed by at least one of circuits, and configured to comprise an image capturing device 20, a face detecting device 21, a face angle calculating device 22, an eye angle calculating device 23, a gazing angle determining device 24, an object-being-gazed determination device 25, a time counting device 26, and an indication device 27. The image capturing device 20 is electrically connected to the face detecting device 21, the face detecting device 21 is electrically connected to the face angle calculating device 22, the face angle calculating device 22 is electrically connected to the eye angle calculating device 23, and the eye angle calculating device 23 is electrically connected to the gazing angle determining device 24. The gazing angle determining device 24 is electrically connected to the object-being-gazed determination device 25 and the image capturing device 20, the object-being-gazed determination device 25 is electrically connected to the time counting device 26 and the image capturing device 20, and the time counting device 26 is electrically connected to the indication device 27 and the image capturing device 20. The gaze analysis apparatus 2 is used to execute the gaze analysis method, and the function of each component will be described as follows.

Figure 3:
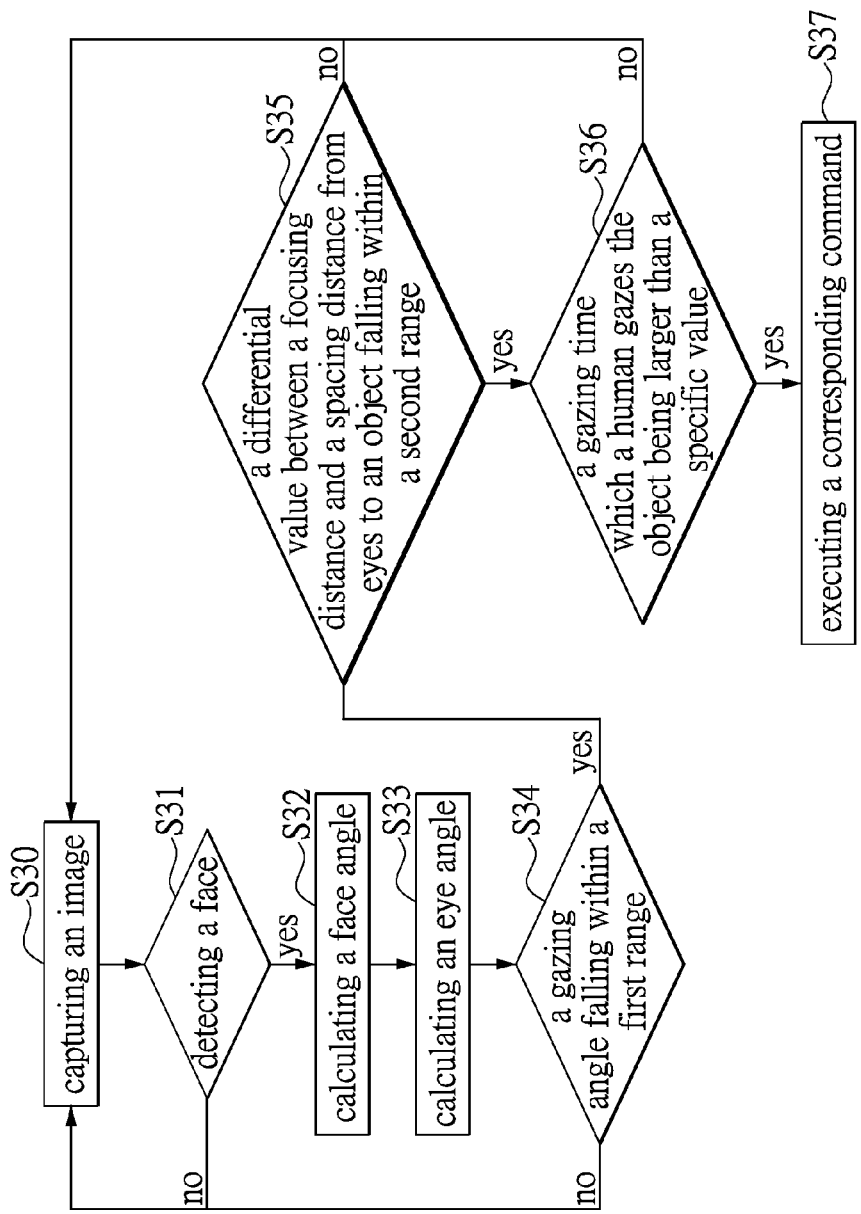
FIG. 3 is a flowchart of a gaze analysis method according to an exemplary embodiment of the present disclosure.

Next, referring to FIG. 2 and FIG. 3, FIG. 3 is a flowchart of a gaze analysis method according to an exemplary embodiment of the present disclosure. Firstly, at step S30, the image capturing device 20 captures an image, and the captured image is sent to the face detecting device 21. Next, at step S31, the face detecting device 21 performs the face detection on the image to determine whether the face is in the image, wherein the Markov modeling face detection can be used to implement the face detection. However, the present disclosure does not limit the implementation of the face detection. When the face is detected in the image, the face detecting device 21 sends the image to the face angle calculating device 22 to execute step S32; when the face is not detected in the image, the face detecting device 21 indicates the image capturing device 20 to execute step S30 again.

At step S32, the face angle calculating device 22 calculates a face angle $A_{face}$ according to the face in the image, the face angle $A_{face}$ comprises a horizontal rotation angle $A_{horizontal}$ and an elevation angle $A_{vertical}$ of the face, wherein the calculation of the face angle $A_{face}$ comprises obtaining positions of the eyes and mouth within the face in the image, and referring the head shape model. However, the present disclosure does not limit the implementation for calculating the face angle $A_{face}$. In addition, in the exemplary embodiment of the present disclosure, merely the horizontal rotation angle $A_{horizontal}$ of the face is calculated without calculating the elevation angle $A_{vertical}$, and that is, the face angle $A_{face}$ merely comprises the horizontal rotation angle $A_{horizontal}$ of the face. After the face angle calculating device 22 calculates the face angle $A_{face}$, it sends the image to the eye angle calculating device 23.

Next, at step S33, the eye angle calculating device 23 calculates the eye angle $A_{eye}$ according to the image, and the eye angle $A_{eye}$ is obtained according to a ratio relation of lengths of the two irises and the two scleras associated with the left and right eyes. Next, one implementation which the eye angle $A_{eye}$ is obtained according to a ratio relation of lengths of the two irises and the two scleras associated with the left and right eyes is illustrated, and however, the present disclosure is not limited thereto.

Figure 4:
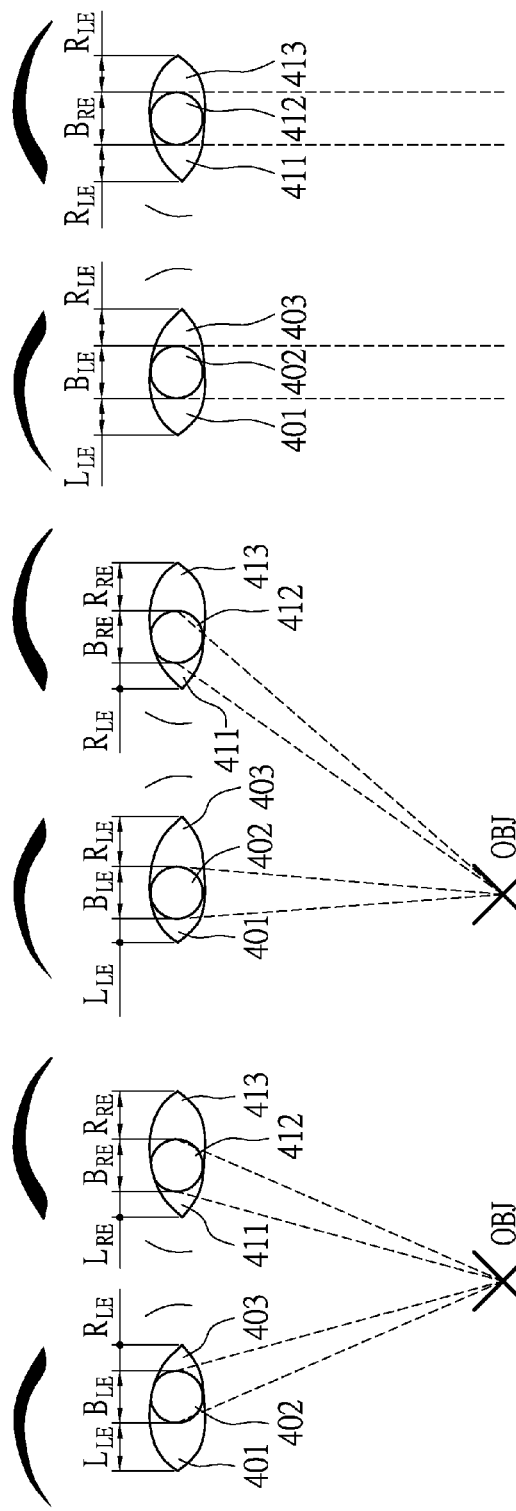
FIG. 4A is a schematic diagram showing eyes when a person directly gazes at a front object according to an exemplary embodiment of the present disclosure.
FIG. 4B is a schematic diagram showing eyes when a person gazes at a side object according to an exemplary embodiment of the present disclosure.
FIG. 4C is a schematic diagram showing eyes when a person gazes at an infinitely long place according to an exemplary embodiment of the present disclosure.

Referring to FIG. 4A, FIG. 4A is a schematic diagram showing eyes when a person directly gazes at a front object according to an exemplary embodiment of the present disclosure. In FIG. 4A, when the person gazes at the front object OBJ, the eye angle $A_{eye}$ is 0 degree, and theoretically, the differential length of the length $L_{LE}$ of the left portion within the sclera of the left eye 401 and the length $R_{LE}$ of the right portion within the sclera of the left eye 403 is the same as the differential length of the length $R_{RE}$ of the right portion within the sclera of the right eye 413 and the length $L_{RE}$ of the left portion within the sclera of the right eye 411, i.e. $L_{LE}-R_{LE}=R_{RE}-L_{RE}$.

Referring to FIG. 4B, FIG. 4B is a schematic diagram showing eyes when a person gazes at a side object according to an exemplary embodiment of the present disclosure. In FIG. 4B, when the person gazes at the side object OBJ, the eye angle $A_{eye}$ is not 0 degree, and theoretically, the differential length of the length $L_{LE}$ of the left portion within the sclera of the left eye 401 and the length $R_{LE}$ of the right portion within the sclera of the left eye 403 is not the same as the differential length of the length $R_{RE}$ of the right portion within the sclera of the right eye 413 and the length $L_{RE}$ of the left portion within the sclera of the right eye 411, i.e. $L_{LE}-R_{LE} \neq R_{RE}-L_{RE}$.

Referring to FIG. 4C, FIG. 4C is a schematic diagram showing eyes when a person gazes at an infinitely long place according to an exemplary embodiment of the present disclosure. In FIG. 4C, when the person gazes at the infinitely long place, and theoretically, the differential length of the length $L_{LE}$ of the left portion within the sclera of the left eye 401 and the length $R_{LE}$ of the right portion within the sclera of the left eye 403 is the same as the differential length of the length $L_{RE}$ of the left portion within the sclera of the right eye 411 and the length $R_{RE}$ of the right portion within the sclera of the right eye 413, i.e. $L_{LE}-R_{LE}=L_{RE}-R_{RE}$. Meanwhile, the focusing distance is infinitely long without being not calculated, and the eye angle $A_{eye}$ can be calculated based on the actual condition.

Figure 5:
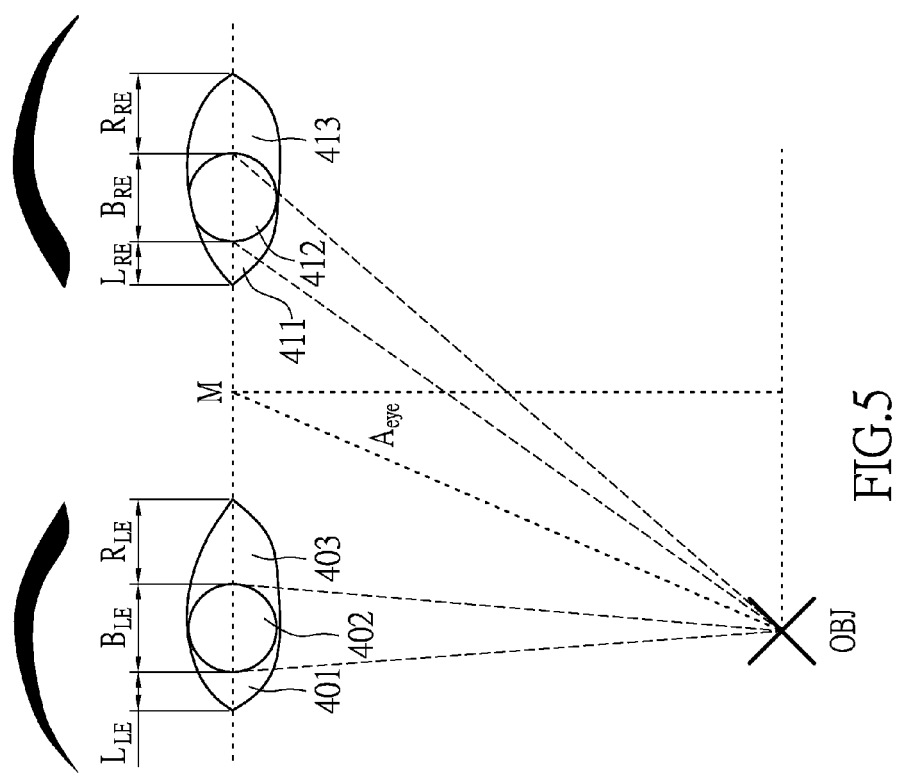
FIG. 5 is a schematic diagram show an eye angle when a person gazes at an object according to an exemplary embodiment of the present disclosure.

Referring to FIG. 5, FIG. 5 is a schematic diagram show an eye angle when a person gazes at an object according to an exemplary embodiment of the present disclosure. The eye angle $A_{eye}$ is the angle formed by the normal line of the center point M of the right and left eyes and the connection line of the center point M of the right and left eyes and the object OBJ. For the three conditions, direct gazing, extremely gazing the left, and extremely gazing the right side, the eye angles $A_{eye}$ of the three conditions are respectively 0, -90, and 90 degrees, and one possible implementing equation for calculating the eye angle $A_{eye}$ is concluded as:

$$A_{eye} = \sin^{-1}\left(\frac{[(L_{LE}-R_{LE})-(R_{RE}-L_{RE})\times 2]}{(L_{LE}+R_{LE}+B_{LE})+(L_{RE}+R_{RE}+B_{RE})}\right)$$

Assuming the person directly gazes at the front object OBJ, the ratio of the lengths $L_{LE}$, $B_{LE}$ (length of the iris of the left eye 402), $R_{LE}$, $L_{RE}$, $B_{RE}$ (length of the iris of the right eye 412), and $R_{RE}$ is 1:2:1:1:2:1, and meanwhile, $A_{eye}=\sin^{-1}(0/4)=0$ degree. When the person extremely gazing at the left side, the ratio of the lengths $L_{LE}$, $B_{LE}$, $R_{LE}$, $L_{RE}$, $B_{RE}$, and $R_{RE}$ is 0:1:1:0:1:1, and meanwhile, $A_{eye}=\sin^{-1}(-4/4)=-90$ degree. When the person extremely gazing at the right side, the ratio of the lengths $L_{LE}$, $B_{LE}$, $R_{LE}$, $L_{RE}$, $B_{RE}$, and $R_{RE}$ is 1:1:0:1:1:0, and meanwhile, $A_{eye}=\sin^{-1}(4/4)=90$ degrees.

In short, in one exemplary embodiment of the present disclosure, the eye angle Aeye is calculated according to the ratio of the differential length $(L_{LE}-R_{LE})$ between left and right portions of the sclera within the left eye over a total length $(L_{LE}+B_{LE}+R_{LE}+L_{RE}+B_{RE}+R_{RE})$ of the left eye and the right eye and the ratio of the differential length $(R_{RE}-L_{RE})$ between left and right portions of the sclera within the right eye over a total length $(L_{LE}+B_{LE}+R_{LE}+L_{RE}+B_{RE}+R_{RE})$ of the left eye and the right eye. However, the above manner is one possible implementation, and the present disclosure is not limited thereto.

Referring to FIG. 2 and FIG. 3, after the eye angle calculating device 23 calculates the eye angle $A_{eye}$ according to the image, the image, the calculated eye angle $A_{eye}$, and information whether the person gazes at the infinitely long place are sent to the gazing angle determining device 24. At step S34, if the person does not gaze at the infinitely long place, the gazing angle determining device 24 can calculate the summation angle of the eye angle $A_{eye}$ and the face angle $A_{face}$ as the gazing angle, and further determine whether the gazing angle falls within the first range, wherein the first range is an angle range. For example, the first range may comprise a horizontal rotation angle range with ±5 degree and an elevation angle range with 40 through 50 degrees.

When gazing angle does not fall within the first range, it means that the person does not gaze at the object, and the gazing angle determining device 24 indicates the image capturing device 20 still to execute step S301; when the gazing angle falls within the first range, it means that the person gazes at the object, and the gazing angle determining device 24 will sends the image to the object-being-gazed determination device 25 to execute step S35. At step S35, the object-being-gazed determination device 25 firstly calculates spacing distance L from the face to the object and the focusing distance MF, then calculates the differential value (MF-L) of the focusing distance MF and the spacing distance L, and next determines whether the differential value falls within the second range, wherein the second range is a distance range with ±D length units. That is, whether the condition, $-D \leq (MF-L) \leq D$, is true is determined. Next, the details for calculating the focusing distance and spacing distance are illustrated.

Figure 6:
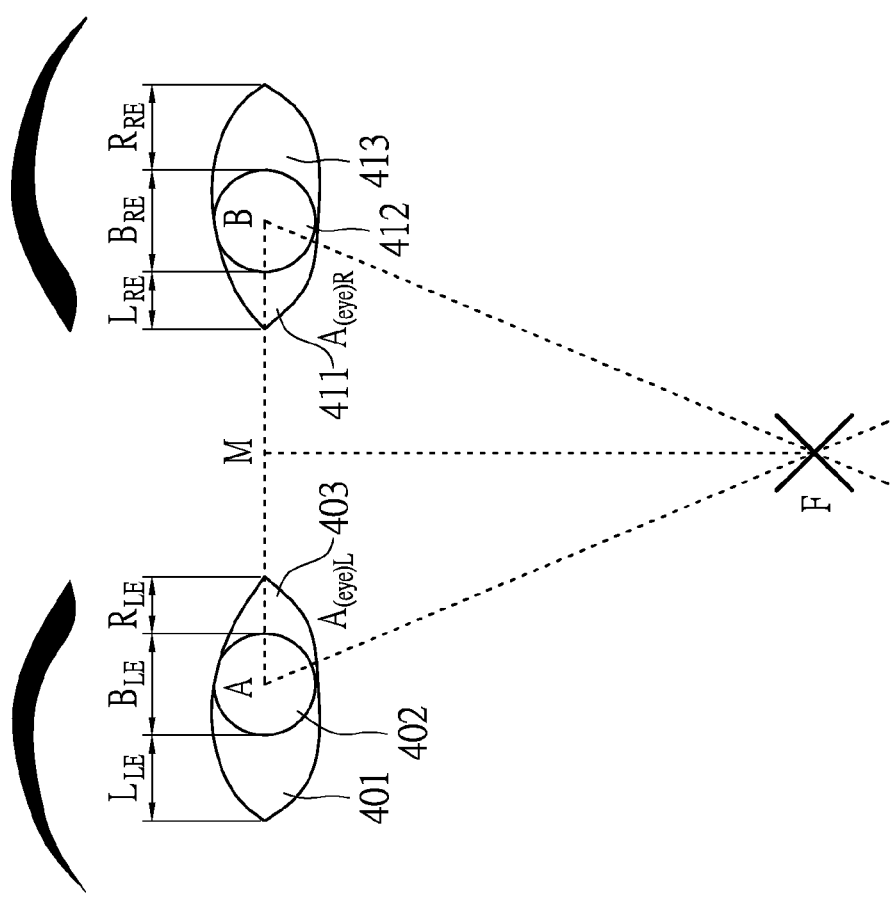
FIG. 6 is a schematic diagram show a focusing distance when a person gazes at an object according to an exemplary embodiment of the present disclosure.

Referring to FIG. 6, FIG. 6 is a schematic diagram show a focusing distance when a person gazes at an object according to an exemplary embodiment of the present disclosure. In FIG. 6, the right and left eyes are towards the focusing point F, and the focusing distance MF of the eyes relates to the information of the iris and the sclera of the left eye and the information of the iris and the sclera of the right eye. In the exemplary embodiment, to put it concretely, the connection line AF of the center point of the left eye ball A and focusing point F and the connection line AM of the center point of the left eye ball A and the center point M of the right and left eyes form the left eye angle $A_{(eye)L}$, and the left eye angle $A_{(eye)L}$ is determined according to the ratio $L_{LE}/(L_{LE}+R_{LE})$ which a left portion of the sclera of the left eye occupies within all of the sclera of the left eye, i.e.

$A_{(eye)L}=180°\cdot(L_{LE}/(L_{LE}+R_{LE}))$. Similarly, the connection line BF of the center point of the right eye ball B and focusing point F and the connection line BM of the center point of the right eye ball B and the center point M of the right and left eyes form the right eye angle $A_{(eye)R}$, and the right eye angle $A_{(eye)R}$ is determined according to the ratio $L_{RE}/(L_{RE}+R_{RE})$ which a right portion on of the sclera of the right eye occupies within all of the sclera of the right eye, i.e. $A_{(eye)R}=180°\cdot(L_{RE}/(L_{RE}+R_{RE}))$.

Next, by using the cosine theorem, according to the left eye angle $A_{(eye)L}$, the right eye angle $A_{(eye)R}$, and distance AB between the two center points of the eye balls of the right and left eyes, the focusing distance MF can be determined. Specifically, by using the cosine theorem, the distance AF between the center point of the left eye ball A and the focusing point F and the distance BF between the center point of the right eye ball B and the focusing point B are obtained firstly, and next, the focusing distance MF can be determined according to the distances AB, AF, and BF.

The equation formed by the cosine theorem can be expressed as:

$$\frac{AB}{\sin(180°-A_{(eye)L}-A_{(eye)R})} = \frac{AF}{\sin(A_{(eye)L})} = \frac{BF}{\sin(A_{(eye)R})}$$

By using the above equation, the distance AF and BF can be obtained. The equation for obtaining the focusing distance MF can be formed by triangle parallelogram law and expressed as follows:

$$MF = \tfrac{1}{2}\sqrt{2(AF^2+BF^2)-AB^2}$$

Figure 7:
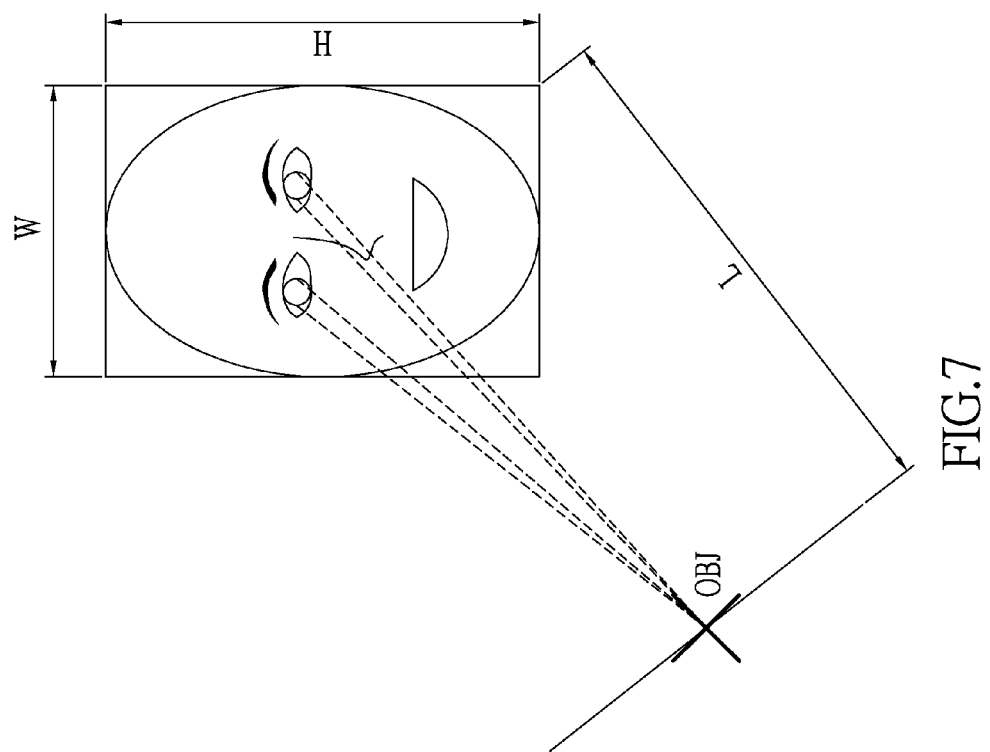
FIG. 7 is a schematic diagram showing a spacing distance from a face to an object is calculated based on an area of the face according to an exemplary embodiment of the present disclosure.

Next, referring to FIG. 7, FIG. 7 is a schematic diagram showing a spacing distance from a face to an object is calculated based on an area of the face according to an exemplary embodiment of the present disclosure. In FIG. 7, the area of the face is the product of the face width W and the face height H. Generally speaking, the larger the area (W·H) of the face in the image is, the shorter the spacing distance L from the face to the object OBJ is; by contrast, the smaller the area (W·H) of the face in the image is, the longer the spacing distance L from the face to the object OBJ is. Thus, the inverting number 1/(W·H) of the area of the face can be multiplied with a specific vale to obtain the spacing distance L from the face to the object OBJ.

When the differential value (MF−L) of the focusing distance Mf and the spacing distance L does not fall within the second range, the object-being-gazed determination device 25 indicates the image capturing device 20 still to execute step S39; when the differential value (MF−L) of the focusing distance MF and the spacing distance L falls within the second range, the object-being-gazed determination device 25 indicates the time counting device 26 to execute step S36.

At step S36, the time counting device 26 calculates the continuous or accumulation time which the gazing angle falls within the first range and the differential value (MF−L) of the focusing distance MF and the spacing distance L falls within the second range, so as to obtain the gazing time which the object is gazed, and then determines whether the gazing time is larger than the specific vale (for example, T time units), so as to determine whether the object is gazed. When the gazing time is not larger than the specific value, the time counting device 26 indicates the image capturing device 20 still to execute step S30; when the gazing time is larger than the specific value, the time counting device 26 indicates the indication device 27 to execute step S37. At step S37, the indication device 27 to execute the corresponding command to order other hardware or device to execute the corresponding action.

Accordingly, the gaze analysis method and apparatus provided by exemplary embodiments of the present disclosure determine whether the object is gazed according to the information of the irises and scleras of the left and right eyes. Thus, compared to the related art, the gaze analysis method and apparatus of the present exemplary embodiments are not affected by the light illumination. As such, the gaze analysis method can be performed with low computation complexity, and the apparatus are equipped less costly without the high resolution lens or the help of infrared ray.

The foregoing description, for purpose of explanation, has been described with reference to specific exemplary embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure, to thereby enable others skilled in the art to best utilize the various exemplary embodiments with various modifications as are suited to the particular use contemplated.

What is claimed is:

1. A gaze analysis method, executed by a gaze analysis apparatus, the gaze analysis apparatus comprising an image capturing device, a face detecting device, a face angle calculating device, an eye angle calculating device, a gazing angle determining device, an object-being-gazed determination device, and a time counting device, the method comprising:
   detecting at least one face in an image captured by the image capturing device through the face detecting device;
   calculating a gazing angle of the face in the image according to a face angle and an eye angle of the face in the image through the eye angle calculating device, and determining whether the gazing angle falls within a first range through the gazing angle determining device, wherein the eye angle is obtained according to information of an iris and a sclera of a left eye and information of an iris and a sclera of a right eye through the eye angle calculating device;
   determining a differential value between a focusing distance and a spacing distance falls within a second range if the gazing angle falls within the first range, and determining whether the object is gazed according to a detecting result whether the differential value falls within the second range through the object-being-gazed determination device, wherein the focusing distance is determined according to the information of the iris and the sclera of the left eye and the information of the iris and the sclera of the right eye through the object-being-gazed determination device;
   calculating a continuous or accumulation time which the differential value falls within the second range, so as to obtain a gazing time through the time counting device; and
   determining whether the gazing time is larger than a specific value through the time counting device; wherein when the gazing time is larger than the specific value, the indication device is used for executing a corresponding command.

2. The gaze analysis method according to claim 1, wherein positions of a mouth and the two eyes within the face in the image are obtained, and at least one head shape model is referred to obtain the face angle.

3. The gaze analysis method according to claim 1, wherein the eye angle is determined according to a ratio relation of lengths of the two irises and the two scleras associated with the left and right eyes.

4. The gaze analysis method according to claim 3, the eye angle is determined according to a ratio of a first differential length over a total length of the left eye and the right eye and a ratio of a second differential length over the total length of the left eye and the right eye and a ratio, wherein the first differential length is a differential between left and right portions of the sclera within the left eye, and the first differential length is a differential between left and right portions of the sclera within the right eye.

5. The gaze analysis method according to claim 1, wherein a left eye angle which a center point of an eye ball of the left eye is towards a focusing point is determined according to a ratio which a left portion of the sclera of the left eye occupies within all of the sclera of the left eye, a right eye angle which a center point of an eye ball of the right eye is towards the focusing point is determined according to a ratio which a right portion of the sclera of the right eye occupies within all of the sclera of the right eye, and the focusing distance is determined according to the left eye angle, the right eye angle, and a distance between the two center points of the eye balls of the right and left eyes.

6. The gaze analysis method according to claim 5, wherein by using a cosine theorem, a first distance from the eye ball of left eye to the focusing point and a second distance from the eye ball of right eye to the focusing point are obtained according to according to the left eye angle, the right eye angle, and the distance between the two center points of the eye balls of the right and left eyes, and by using a parallelogram law, the focusing distance is determined according to the first distance, the second distance, and the distance between the two center points of the eye balls of the right and left eyes.

7. The gaze analysis method according to claim 1, wherein the spacing distance is calculated according to an area of the face in the image.

8. The gaze analysis method according to claim 1, further comprising:
   detecting whether the face in the image.

9. The gaze analysis method according to claim 8, wherein a Markov modeling face detection manner is used to detect whether the face in the image.

10. The gaze analysis method according to claim 1, wherein the face angle comprises a horizontal rotation angle.

11. The gaze analysis method according to claim 10, wherein the face angle comprises an elevation angle.

12. A gaze analysis apparatus, comprising:
   an image capturing device, used to capture an image;
   a face detecting device, electrically connected to the image capturing device, used to perform face detection on the image to detect at least one face in the image;
   a face angle calculating device, electrically connected to the face detecting device, when the face in the image is detected, used to calculate a face angle;
   an eye angle calculating device, electrically connected to the face angle calculating device, when the face in the image is detected, used to calculate an eye angle according to information of an iris and a sclera of a left eye and information of an iris and a sclera of a right eye in the image;
   a gazing angle determining device, electrically connected to the eye angle calculating device, when the face in the image is detected, used to calculate a gazing angle according to a face angle and an eye angle, and determine whether the gazing angle falls within a first range;
   an object-being-gazed determination device, electrically connected to the gazing angle determining device, used to determine a differential value between a focusing distance and a spacing distance falls within a second range if the gazing angle falls within the first range, and determining whether the object is gazed according to a detecting result whether the differential value falls within the second range, wherein the focusing distance is obtained according to the information of the iris and the sclera of the left eye and the information of the iris and the sclera of the right eye;
   a time counting device, electrically connected to the object-being-gazed determination device, used to calculate a continuous or accumulation time which the differential value falls within the second range, so as to obtain a gazing time, and determine whether the gazing time is larger than a specific value; and
   an indication device, electrically connected to the time counting device when the gazing time is larger than the specific value, used to execute a corresponding command.

13. The gaze analysis apparatus according to claim 12, wherein the face detecting device obtains positions of a mouth and the two eyes within the face in the image, and refers at least one head shape model to obtain the face angle.

14. The gaze analysis apparatus according to claim 12, wherein the eye angle calculating device determines the eye angle according to a ratio relation of lengths of the two irises and the two scleras associated with the left and right eyes.

15. The gaze analysis apparatus according to claim 14, wherein the eye angle is determined according to a ratio of a first differential length over a total length of the left eye and the right eye and a ratio of a second differential length over the total length of the left eye and the right eye and a ratio, wherein the first differential length is a differential between left and right portions of the sclera within the left eye, and the first differential length is a differential between left and right portions of the sclera within the right eye.

16. The gaze analysis apparatus according to claim 12, wherein the object-being-gazed determination device determines a left eye angle which a center point of an eye ball of the left eye is towards a focusing point according to a ratio which a left portion of the sclera of the left eye occupies within all of the sclera of the left eye, determines a right eye angle which a center point of an eye ball of the right eye is towards the focusing point according to a ratio which a right portion of the sclera of the right eye occupies within all of the sclera of the right eye, and determines the focusing distance according to the left eye angle, the right eye angle, and a distance between the two center points of the eye balls of the right and left eyes.

17. The gaze analysis apparatus according to claim 16, wherein by using a cosine theorem, the object-being-gazed determination device obtains a first distance from the eye ball of left eye to the focusing point and a second distance from the eye ball of right eye to the focusing point according to according to the left eye angle, the right eye angle, and the distance between the two center points of the eye balls of the right and left eyes, and by using a parallelogram law, the object-being-gazed determination device obtains the focusing distance according to the first distance, the second distance, and the distance between the two center points of the eye balls of the right and left eyes.

18. The gaze analysis apparatus according to claim 12, wherein the object-being-gazed determination device calculates the spacing distance according to an area of the face in the image.

* * * * *